US012640366B2

(12) United States Patent     (10) Patent No.:   US 12,640,366 B2
Cao et al.     (45) Date of Patent:     May 26, 2026

(54) PREPARATION OF SILICON COMPOSITE MATERIAL, AND NEGATIVE ELECTRODE PLATE CONTAINING SAME

(71) Applicants: REPT BATTERO Energy Co., Ltd., Zhejiang (CN); Shanghai Ruipu Energy Co., Ltd., Shanghai (CN)

(72) Inventors: Hui Cao, Wenzhou (CN); Yuwei Sun, Wenzhou (CN); Min Hou, Shanghai (CN); Chan Liu, Shanghai (CN); Jinzuan Wang, Shanghai (CN); Zhaoyu Yu, Wenzhou (CN)

(73) Assignees: REPT BATTERO Energy Co., Ltd., Wenzhou (CN); Shanghai Ruipu Energy Co., Ltd., Shanghai (CN)

( * ) Notice: Subject to any disclaimer, the term of this patent is extended or adjusted under 35 U.S.C. 154(b) by 664 days.

(21) Appl. No.: 18/108,410

(22) Filed: Feb. 10, 2023

(65) Prior Publication Data

US 2023/0187611 A1     Jun. 15, 2023

Related U.S. Application Data

(63) Continuation of application No. PCT/CN2021/134934, filed on Dec. 2, 2021.

(30) Foreign Application Priority Data

Dec. 24, 2020   (CN) .......................... 202011547186.4

(51) Int. Cl.
*H01M 10/0525*     (2010.01)
*H01M 4/04*     (2006.01)
       (Continued)

(52) U.S. Cl.
CPC ......... *H01M 4/364* (2013.01); *H01M 4/0471* (2013.01); *H01M 4/386* (2013.01);
       (Continued)

(58) Field of Classification Search
CPC .... H01M 4/364; H01M 4/0471; H01M 4/386; H01M 4/583; H01M 4/625; H01M 4/662;
       (Continued)

(56) References Cited

U.S. PATENT DOCUMENTS

2013/0136988 A1    5/2013   Tanaka et al.
2014/0205907 A1    7/2014   Kang et al.
       (Continued)

FOREIGN PATENT DOCUMENTS

CN     103219504 A    7/2013
CN     105609743 A    5/2016
       (Continued)

OTHER PUBLICATIONS

The State Intellectual Property Office of People's Republic of China, First Office Action and Search Report, Application No. 202011547186.4, Feb. 7, 2021, 14 pages.
       (Continued)

*Primary Examiner* — Matthew T Martin
*Assistant Examiner* — Kevin Song
(74) *Attorney, Agent, or Firm* — Quarles & Brady LLP

(57) ABSTRACT

Preparation of a silicon composite material, and a negative electrode plate containing same, relating to the field of silicon-based composite materials. The silicon composite material comprises silicon nanoparticles, carbon nanotubes, silicon oxide, lithium oxide, and lithium metasilicate. The carbon nanotubes and the silicon nanoparticles are dispersed and cross-linked to form a three-dimensional network structure. Silicon oxide, lithium oxide, and lithium metasilicate cover the three-dimensional network structure to form secondary particles. The secondary particles and graphite are homogenized and coated according to a specific particle size ratio to prepare the negative electrode plate containing the silicon composite material and having high-capacity devel-
       (Continued)

opment, good conductivity, high coulombic efficiency, small volume expansion, and high cycling stability.

7 Claims, 3 Drawing Sheets

(51) Int. Cl.

| | |
|---|---|
| *H01M 4/36* | (2006.01) |
| *H01M 4/38* | (2006.01) |
| *H01M 4/583* | (2010.01) |
| *H01M 4/62* | (2006.01) |
| *H01M 4/66* | (2006.01) |
| *H01M 4/02* | (2006.01) |

(52) U.S. Cl.
CPC ........... *H01M 4/583* (2013.01); *H01M 4/625* (2013.01); *H01M 4/662* (2013.01); *H01M 10/0525* (2013.01); *H01M 2004/027* (2013.01)

(58) Field of Classification Search
CPC ....... H01M 10/0525; H01M 2004/027; H01M 4/0404; H01M 4/133; H01M 4/134; H01M 4/483; H01M 4/622; H01M 4/661; H01M 4/587; H01M 4/624; H01M 4/628; H01M 2004/021; H01M 4/1395; H01M 4/366; H01M 4/62; B82Y 30/00; Y02E 60/10

See application file for complete search history.

(56) References Cited

U.S. PATENT DOCUMENTS

| | | | |
|---|---|---|---|
| 2017/0117543 A1 | 4/2017 | Park et al. | |
| 2021/0193990 A1 | 6/2021 | Awano et al. | |
| 2022/0069295 A1 | 3/2022 | Zettsu et al. | |

FOREIGN PATENT DOCUMENTS

| | | | |
|---|---|---|---|
| CN | 106328913 A | 1/2017 | |
| CN | 107658452 A | 2/2018 | |
| CN | 107887587 A | 4/2018 | |
| CN | 108063232 A | 5/2018 | |
| CN | 108701824 A | 10/2018 | |
| CN | 110212183 A | 9/2019 | |
| CN | 110797512 A | 2/2020 | |
| CN | 110993949 A | 4/2020 | |
| CN | 111048764 A | 4/2020 | |
| CN | 111082014 A | 4/2020 | |
| CN | 111653738 A | 9/2020 | |
| CN | 111900369 A | 11/2020 | |
| CN | 112310402 A | 2/2021 | |
| JP | 2012059721 A | 3/2012 | |
| JP | 2015508559 A | 3/2015 | |
| JP | 2017091778 A | 5/2017 | |
| WO | 2012018035 A1 | 2/2012 | |
| WO | 2018155609 A1 | 8/2018 | |
| WO | 2020105731 A1 | 5/2020 | |

OTHER PUBLICATIONS

The State Intellectual Property Office of People's Republic of China, The Second Office Action, Application No. 202011547186.4, Feb. 22, 2021, 10 pages.

The State Intellectual Property Office of People's Republic of China, Supplementary Search, Application No. 202011547186.4, Mar. 3, 2021, 1 page.

PCT International Search Report and Written Opinion, PCT/CN2021/134934, Jan. 27, 2022, 15 pages.

European Patent Office, Extended European Search Report, Application No. 21909093.3, Jun. 27, 2024, 7 pages.

Japanese Patent Office, Notice of Reasons for Refusal and Search Report, Application No. 2023-503224, Mar. 22, 2024, 49 pages.

PREPARATION OF SILICON COMPOSITE MATERIAL, AND NEGATIVE ELECTRODE PLATE CONTAINING SAME

CROSS-REFERENCE TO RELATED APPLICATIONS

This application is a continuation of International Patent Application No. PCT/CN2021/134934 filed Dec. 2, 2021, which claims priority to Chinese Patent Application No. 202011547186.4 filed Dec. 24, 2020, the disclosure of which is incorporated herein by reference in its entirety and for all purposes.

TECHNICAL FIELD

The disclosure belongs to the technical field of silicon-based composite materials and relates to the preparation of a silicon composite material and a negative electrode plate containing the same, in particular to a silicon/carbon nanotube/silicon oxide/lithium oxide/lithium silicate composite material and preparation of negative electrode plate containing the same.

BACKGROUND

With the continuous popularization of batteries for new energy vehicles and the continuous demand of consumers for cruising range, further improving the energy density of batteries has become the key. Silicon has the advantages of high gram capacity (>3,000 mAh/g), abundant resources, and low potential to lithium, making it a popular choice to replace graphite. However, severe volume expansion (about 300%) occurs after silicon is lithiated, resulting in poor cycle stability. Studies have shown that coating silicon nanoparticles with silicon oxide to form secondary particles can isolate the direct contact between the electrolyte and silicon and can inhibit the expansion of silicon particles through silicon oxide. However, there will still be secondary particle breakage in the later stage of cycles, resulting in direct contact between silicon and the electrolyte at the new broken interface to produce side reactions and worsen the cycle.

To solve the above problems, patent CN107658452 proposes a silicon/carbon nanotube/silicon oxycarbide composite material, which uses carbon nanotubes to strengthen the connection between silicon nanoparticles and maintain the stability of secondary particles. However, the silicon oxide in the composite material will react with lithium ions to form irreversible side products lithium oxide and lithium silicate during the first lithiation of battery. This by-product consumes a large amount of lithium, resulting in a low first battery efficiency. Therefore, improving the first effect while suppressing the volume expansion of silicon materials is an urgent problem to be solved.

SUMMARY

In view of the above, the object of the present disclosure is to provide a preparation of a silicon composite material and a negative electrode plate containing the same. The silicon/carbon nanotube/silicon oxide/lithium oxide/lithium silicate composite material provided by the present disclosure can not only exert the high gram capacity of silicon, suppress the expansion of lithiated silicon, but also maintain a high first coulombic efficiency, and improve the conductivity performance of silicon at the same time. The silicon composite material (silicon/carbon nanotube/silicon oxide/ lithium oxide/lithium silicate composite material) is slurried with graphite according to a specific particle size ratio and made into a negative electrode plate. The negative electrode plate has high capacity, good electrical conductivity, high coulombic efficiency, small volume expansion and high cycle stability.

The purpose of the present disclosure is achieved by the following technical solutions.

In a first aspect, the present disclosure provides a method for preparing a negative electrode plate containing a silicon composite material, wherein the negative electrode plate also contains graphite; a particle size ratio of the silicon composite material to the graphite is 1:10~1:5; the method includes the following steps:

S1. add silicon nanoparticles, carbon nanotubes, silane coupling agent, and dispersant into an organic solvent, stir evenly, and spray dry to obtain a mixed powder; carbonize the mixed powder at high temperature, and ball mill to obtain a silicon/carbon nanotube/silicon-oxygen complex;

S2. perform activation treatment on the silicon/carbon nanotube/silicon-oxygen complex; mix the activated silicon/carbon nanotube/silicon-oxygen complex with a lithium source, and ball mill to obtain a mixture; heat treat the mixture; classify the heat-treated mixture to obtain secondary particles which are the silicon composite material;

S3. mix the silicon composite material with the graphite, conductive carbon and polyacrylic acid emulsion to prepare a slurry; apply the slurry on a negative electrode current collector; roll and then dry under vacuum and high temperature to form the negative electrode plate.

As an embodiment of the present disclosure, in step S1, the silane coupling agent is one of the below substances: bis(alkyleneimino)alkenylmethylsilane, alkyleneiminoalkenyldimethylsilane, aryleneiminoalkenyldimethylsilane, tris (alkyleneimino)alkenylsilane, diarylaminoalkenyldimethylsilane, bis(aryleneimino)alkenylmethylsilane, bis (diarylamino)alkenylmethylsilane and tris(aryleneimino) alkenylsilane.

As an embodiment of the present disclosure, in step S1, the dispersant is polyethylene glycol with a weight average molecular weight ranging from 800 to 5,000.

As an embodiment of the present disclosure, in step S1, the organic solvent is one or a mixture of carbon tetrachloride, N-methylpyrrolidone, acetone, diphenylamine, toluene, and diethanol.

As an embodiment of the present disclosure, in step S1, the temperature of the high-temperature carbonization is 300-700° C., and the carbonization time at this temperature is 3-7 h.

In step S1, a weight ratio of the silicon nanoparticles, carbon nanotubes, silane coupling agent, dispersant, and organic solvent is (1~5):(0.01~0.05):(1~5):(0.1~1):100.

As an embodiment of the present disclosure, in step S2, the step of activation treatment comprises: uniformly mixing an activator with the silicon/carbon nanotube/silicon-oxygen complex to obtain an mixed product; drying and heat treating the mixed product, and then cooling to room temperature under gas protection;

As an embodiment of the present disclosure, the activator includes one or more of below substances: 0.1-3M HF, 0.1~1M HCl, 0.1~1M sodium nitrate, and 0.1~1M potassium permanganate.

As an embodiment of the present disclosure, in the drying and heat treatment, the drying temperature is 60-100° C., and the drying time is 6-10 h; the heat treatment temperature is 500-800° C., and the heat treatment time is 5-10 h.

As an embodiment of the present disclosure, in step S2, the lithium source comprises a solid-phase and/or liquid-phase lithium source; the liquid-phase lithium source comprises one or more of below substances: lithium sulfate, lithium nitrate, and lithium halides.

As an embodiment of the present disclosure, in step S2, the step of heat treatment is: keeping warm for 1 h to 2 h under vacuum at a temperature of 2,500-4,500° C. In the system of the present disclosure, due to the influence of carbon nanotubes, the vacuum temperature is too low, the holding time is too short, the lithium source cannot fully react with the silicon/carbon nanotubes/silicon-oxygen complex, and the resulting composite particles have the problem of high charging capacity, low first coulombic efficiency, short cycle life and large expansion. A certain holding time can promote the stress release of the carbon nanotubes in the composite particles and make them more uniformly dispersed. However, if the holding time is too long, the particle size of silicon element in the complex will increase, resulting in excessive partial expansion after lithiation, resulting in poor particle breakage cycle.

As an embodiment of the present disclosure, in step S2, the step of classifying includes: mechanical grinding and shaping or jet milling to remove surface oxide film, and sieving and classifying.

As an embodiment of the present disclosure, the silicon composite material and the graphite are classified so that the ratio of the particle size of the silicon secondary particles to the particle size of the graphite particles is 1:10~1:5. In step S3, the particle size ratio of the silicon composite material to the graphite is 1:10~1:5. If the particle size ratio is lower than 1:5, the particles expand violently after silicon is lithiated during cycles, resulting in the destruction of the arrangement structure of the surrounding graphite particles, and the cycle stability of the pole piece decreases; if the ratio is higher than 1:10, the silicon particles are too small or the graphite particles are too large. Too small silicon particles lead to excessive specific surface area, excessive consumption of electrolyte, resulting in accelerated attenuation in the later stage of the cycles; too large graphite particles lead to a decrease in the conductivity of the pole piece. Preferably, the optimal range of the particle size ratio of the silicon secondary particles to the graphite particles is 1:8~1:6.

As an embodiment of the present disclosure, in step S3, the negative electrode current collector comprises a copper foil, a nickel foil or a copper-nickel alloy.

As an embodiment of the present disclosure, in step S3, the effective mass ratio of the silicon composite material, the graphite, the conductive carbon and the polyacrylic acid emulsion (PAA) is 10%: 70%: 10%: 10%-2%: 78%: 10%: 10%. That is, in the slurry, the mass ratio of the silicon composite material, the graphite, the conductive carbon and the polyacrylic acid emulsion is 1:7:1:1~0.2:7.8:1:1.

As an embodiment of the present disclosure, in step S3, the areal density of the coating on the copper foil is 80 g/m²~200 g/m².

As an embodiment of the present disclosure, in step S3, the rolling density is 1.45 g/cc~1.75 g/cc.

As an embodiment of the present disclosure, in step S3, the temperature range of the vacuum high temperature is 80° C.~150° C.

As an embodiment of the present disclosure, in step S3, the drying time is 10 h~48 h.

In a second aspect, the present disclosure provides negative electrode plate containing a silicon composite material prepared by the above method.

The specific particle size ratio of the silicon composite material and the graphite in the negative electrode plate is the particle size ratio of the silicon D50 particle size and the graphite D50 particle size, which is 1:10-1:5.

The negative electrode is used for lithium batteries.

In a third aspect, the present disclosure provides a silicon composite material, the composite material comprises silicon nanoparticles, carbon nanotubes, silicon oxide, lithium oxide and lithium silicate; wherein, the carbon nanotubes and the silicon nanoparticles are cross-linked to form a three-dimensional network structure, and the silicon oxide, the lithium oxide and the lithium silicate cover the three-dimensional network structure to form secondary particles.

In the secondary particles, the silicon nanoparticles are covered by silicon oxide, lithium oxide and lithium silicate, while maintaining connection with the carbon nanotubes. When silicon nanoparticles cyclically expand, they are buffered under the coating of silicon oxide, lithium oxide and lithium silicate, and the cyclic expansion is suppressed. At the same time, carbon nanotubes are further constrained to avoid separation between silicon nanoparticles.

As an embodiment of the present disclosure, the carbon nanotubes are single-wall carbon nanotubes or multi-wall carbon nanotubes. Preferably, the single-walled carbon nanotubes have an average diameter of 0.5-5 nm and a length of 10 nm-200 μm. Preferably, the multi-walled carbon nanotubes have an average diameter of 5-20 nm and a length of 10 nm-200 μm. In addition to maintaining the structural stability of the secondary particles, an ion conduction path is provided, which eliminates the step of conventional carbon coating of silicon-oxygen particles to improve conductivity.

As an embodiment of the present disclosure, the average particle size of the silicon nanoparticles is 10-100 nm.

As an embodiment of the present disclosure, the chemical formula of the silicon oxide is $SiO_x$, wherein $1 \leq x \leq 2$, wherein x is an independent variable of the chemical formula $SiO_x$.

The lithium silicate is a product formed from the reaction of lithium and silicon oxide, and is a mixture of $Li_4SiO_4$, $Li_2SiO_3$ and $Li_2Si_2O_5$.

The chemical formula of lithium oxide is $Li_2O$, which is a product formed from the reaction of lithium and silicon oxide.

As an embodiment of the present disclosure, the silicon/carbon nanotube/silicon oxide/lithium oxide/lithium silicate composite material are secondary particles, and the average particle size of the secondary particles is 2-20 μm. If a particle size is less than 2 μm, the specific surface area of the particle is too large, and excessive electrolyte consumption in the cycle leads to accelerated attenuation in the later cycle. If a particle size is larger than 20 μm, the volume change caused by particle expansion is too large, which will destroy the structure of the negative electrode plate. More preferably, the average particle diameter is 5-10 μm.

The silicon composite material is prepared by steps S1 and S2 in the method for preparing the negative electrode plate containing the silicon composite material. Thus, in a fourth aspect, the present disclosure provides a method for preparing silicon composite material, the method includes the following steps:

S1. add silicon nanoparticles, carbon nanotubes, silane coupling agent, and dispersant into an organic solvent, stir evenly, and spray dry to obtain a mixed powder;

carbonize the mixed powder at high temperature, and ball mill to obtain a silicon/carbon nanotube/silicon-oxygen complex;

S2. perform activation treatment on the silicon/carbon nanotube/silicon-oxygen complex; mix the activated silicon/carbon nanotube/silicon-oxygen complex with a lithium source, and ball mill to obtain a mixture; heat treat the mixture; classify the heat-treated mixture to obtain secondary particles which are the silicon composite material.

Compared with the prior art, the present disclosure has following beneficial effects.

1) In the present disclosure, silicon nanoparticles, carbon nanotubes, and silicon dioxide are dispersed and dried, carbonized at high temperature, and ball milled to obtain a silicon/carbon nanotube/silicon-oxygen complex, which is then mixed with a lithium source, stirred by ball milling, heat treated, and graded and sieved, to obtain nano-silicon/carbon nanotubes/silicon oxide/lithium oxide/lithium silicate composite secondary particles, which are then mixed with graphite according to a specific particle size ratio to make a negative electrode plate, which gives full play to the high gram capacity of silicon and improves the conductivity, and ensures the first coulombic efficiency in the battery through the irreversible side reaction of silicon oxygen and lithium in advance.

2) While the volume expansion of the lithiated nano-silicon is suppressed in the silicon secondary particles, the graphite particles also play a role in buffering the expansion of the silicon secondary particles, so that the volume expansion of the negative electrode plate is significantly reduced.

3) The battery made of the composite material prepared by the present disclosure has good cycle stability, small volume expansion and good rate performance, and can be applied to the automotive field.

4) The disclosure has a simple process, omits the CVD coating carbon layer process, and is easy to control and has good repeatability, which provides a new solution for improving the energy density of automobile batteries.

BRIEF DESCRIPTION OF THE DRAWINGS

Features and performances of the present disclosure are further described by the following examples and accompanying drawings.

Among the above, 1 is silicon nanoparticles, 2 is carbon nanotubes, and 3 is silicon oxide, lithium oxide and lithium silicate.

PREFERRED EMBODIMENTS OF THE DISCLOSURE

The present disclosure will be described in detail below in conjunction with embodiments and examples. The following embodiments and examples will help those skilled in the art to further understand the present disclosure, but do not limit the present disclosure in any form. It should be noted that those skilled in the art can make some adjustments and improvements without departing from the concept of the present disclosure. These all belong to the protection scope of the present disclosure.

Embodiment 1

(1) Preparation of Nano-Silicon/Carbon Nanotubes/Silicon-Oxygen Complex.

Add 1 g of nano silicon, 0.05 g of carbon nanotubes, 1 g of alkyleneiminoalkenyldimethylsilane, and 0.1 g of polyethylene glycol with a molecular weight of 900 to 100 g of organic solvent N-methylpyrrolidone in sequence, stir and mix evenly. Spray dry to obtain a mixed powder, carbonize the mixed powder at a high temperature of 600° C. for 5 h, and ball mill to obtain a nano-silicon/carbon nanotube/silicon-oxygen complex.

(2) Lithium Supplementation of Silicon/Carbon Nanotube/Silicon-Oxygen Complex.

Figure 1:
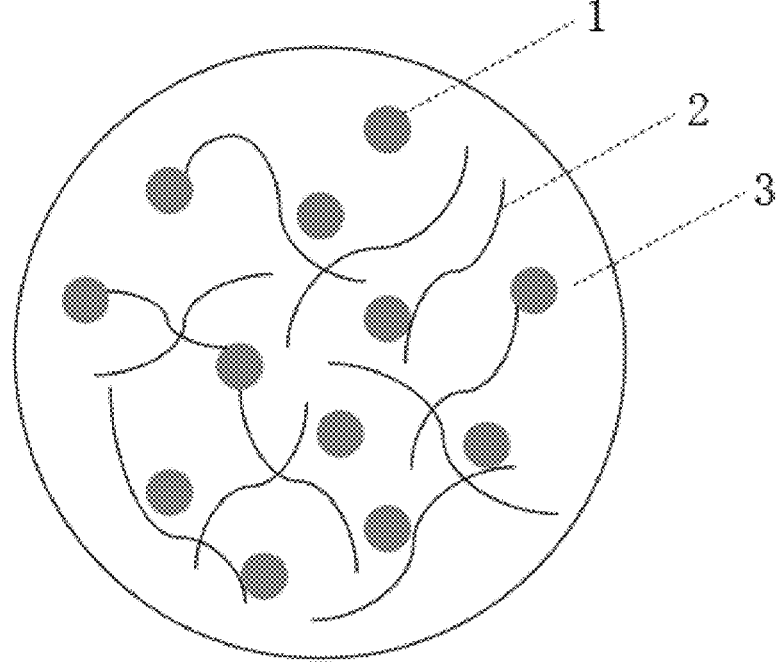
FIG. 1 is the schematic diagram of the secondary particle structure of silicon composite material of embodiment 1.
Figure 2:
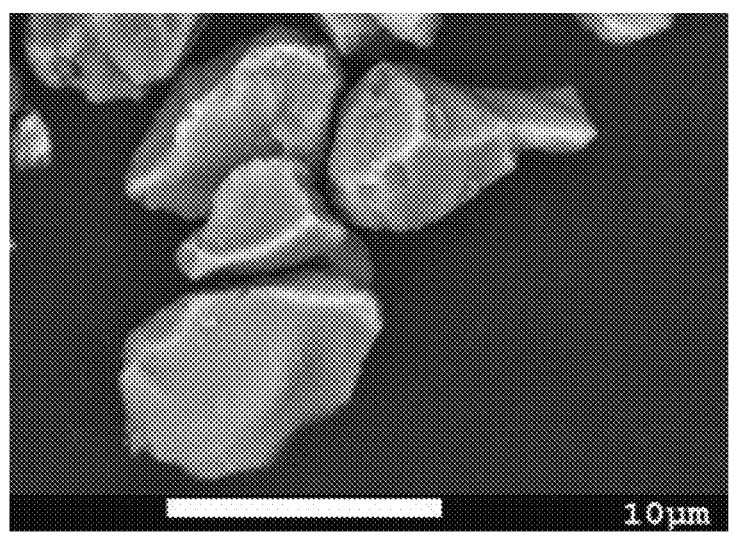
FIG. 2 is the surface SEM backscatter diagram of the silicon composite material of embodiment 1.

Mix the activator (a mixture of 0.15M HCl, 0.05M HF and 0.05M sodium nitrate) and nano-silicon/carbon nanotubes/silicon-oxygen complex at room temperature for 10 h, then dry at 90° C. for 8 h, heat-treat at 550° C. for 6 h, and finally cool to room temperature under the protection of Ar gas. The obtained cooled powder and lithium source (50 wt. % lithium sulfate and 50 wt. % lithium nitrate mixed solution) are evenly mixed and stirred at room temperature for 5 h. Then heat at 3,000° C. under vacuum for 1 h, and cool to room temperature under the protection of Ar gas. The obtained powder is mechanically milled and shaped to remove the surface oxide film, and then sieved and classified to obtain a silicon/carbon nanotube/silicon oxide/lithium oxide/lithium silicate composite material, also known as silicon secondary particles. FIG. 1 is a schematic diagram of the secondary particle structure of the silicon composite material provided in this example. Carbon nanotubes and silicon nano-ions are cross-linked to form a three-dimensional structure, and silicon oxide, lithium oxide and lithium silicate cover the three-dimensional network structure to form secondary particles. FIG. 2 is the SEM backscattered image of the surface of the silicon composite material provided in this example; under the back-emission electron imaging, the particles are bright, indicating that they are all silicon particles. The particles are round and the particle size is less than 10 μm.

(3) Silicon Composite Material is Prepared into Negative Electrode Plate.

Figure 3:
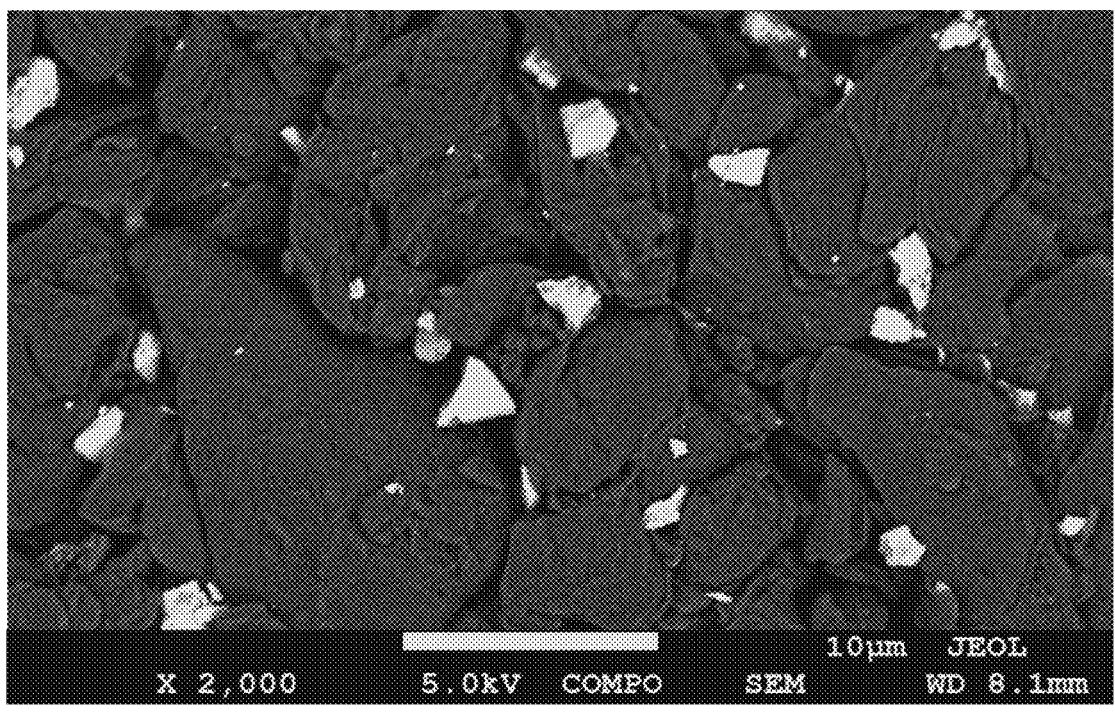
FIG. 3 is the SEM backscatter diagram of the rolled negative pole plate of embodiment 1.

Classify the silicon composite material and graphite so that the particle size ratio of the silicon secondary particle size to the graphite particle is 1:8 (particle size of 50% volume of the silicon secondary particles is 3.1 μm, and particle size of 50% volume of the graphite particles is 24.2 μm). Mix silicon composite material, graphite, conductive carbon and 0.6% polyacrylic acid emulsion (PAA) at an effective mass ratio of 1:7:1:1 to make a slurry, and apply the slurry according to a surface density of 100 g/m² on a copper foil with a thickness of 10 μm, which is then rolled with a rolling density of 1.6 g/cc, and then dried under vacuum at 120° C. for 24 h to make a negative electrode plate. FIG. 3 is a SEM backscatter diagram of the negative electrode plate provided in this embodiment after rolling. The silicon secondary particles are located in the gaps of the graphite particles. When the silicon particles expand after lithiation, the surrounding graphite particles can provide a certain binding force to inhibit its volume expansion. At the same time, the volume expansion of the particles will not lead to rearrangement of the graphite particles, which ensures the structural stability of the pole piece during cycles.

Embodiment 2

(1) Preparation of Nano-Silicon/Carbon Nanotubes/Silicon-Oxygen Complex.

Add 1.5 g of nano-silicon, 0.03 g of carbon nanotubes, 1.5 g of alkyleneiminoalkenyldimethylsilane, and 0.2 g of polyethylene glycol with a molecular weight of 900 to 100 g of organic solvent acetone in sequence, stir and mix evenly. Spray dry to obtain a mixed powder, which is carbonized at a high temperature of 500° C. for 6 h, and ball milled to obtain a nano-silicon/carbon nanotube/silicon-oxygen complex.

(2) Lithium Supplementation of Silicon/Carbon Nanotube/Silicon Oxygen Complex.

The activator (a mixture of 0.25M HCl, 0.02M HF and 0.02M sodium nitrate) was uniformly mixed with nano-silicon/carbon nanotubes/silicon-oxygen complex at room temperature for 8 h. Then dry at 80° C. for 10 h, heat-treat at 500° C. for 7 h, and finally cool to room temperature under the protection of Ar gas. The obtained cooled powder and lithium source (50 wt. % lithium sulfate and 50 wt. % lithium halide mixed solution) are mixed and stirred at room temperature for 6 h, then heated at 3,500° C. under vacuum for 1.5 h, and then cooled to room temperature under the protection of Ar gas. The obtained powder is shaped by a jet mill to remove the oxide film on the surface, and then sieved and classified to obtain a silicon/carbon nanotube/silicon oxide/lithium oxide/lithium silicate composite material.

(3) The Silicon Composite Material is Prepared into a Negative Electrode Plate.

Classify the silicon composite material and graphite so that the particle size ratio of the silicon secondary particle size to the graphite particle is 1:7 ((particle size of 50% volume of the silicon secondary particles is 3.5 μm, and particle size of 50% volume of the graphite particles is 24.2 μm). Mix silicon composite material, graphite, conductive carbon and 0.6% polyacrylic acid emulsion (PAA) at an effective mass ratio of 1:7:1:1 to make a slurry, and apply the slurry according to the surface density of 100 g/m² on a copper foil with a thickness of 10 μm which is then rolled to make the rolling density 1.6 g/cc, and then dried under vacuum at 120° C. for 24 h to make a negative electrode plate.

Embodiment 3

(1) Preparation of Nano-Silicon/Carbon Nanotubes/Silicon-Oxygen Complex.

Add 2 g of nano-silicon, 0.02 g of carbon nanotubes, 1.8 g of alkyleneiminoalkenyldimethylsilane, and 0.6 g of polyethylene glycol with a molecular weight of 900 to 100 g of carbon tetrachloride in sequence, stir and mix evenly. Spray dry to obtain a mixed powder, which is carbonized at a high temperature of 550° C. for 5.5 h, and ball milled to obtain a nano-silicon/carbon nanotube/silicon-oxygen complex.

(2) Lithium Supplementation of Silicon/Carbon Nanotube/Silicon Oxygen Complex.

Mix the activator (a mixture of 0.2M HCl, 0.03M HF and 0.03M sodium nitrate) and nano-silicon/carbon nanotubes/silicon-oxygen complex at room temperature for 9 h. Then dry at 85° C. for 9 h, heat treat at 600° C. for 6 h, and finally cool to room temperature under the protection of Ar gas. The obtained cooled powder and lithium source (50 wt. % lithium nitrate and 50 wt. % lithium halide mixture) are evenly mixed and stirred at room temperature for 7 h, then heated at 2,500° C. under vacuum for 2 h, and cooled to room temperature under the protection of Ar gas. The obtained powder is shaped by a jet mill to remove the oxide film on the surface, and then sieved and classified to obtain a silicon/carbon nanotube/silicon oxide/lithium oxide/lithium silicate composite material.

(3) The Silicon Composite Material is Prepared into a Negative Electrode Plate.

Classify the silicon composite material and graphite so that the particle size ratio of silicon secondary particles to graphite particles is 1:6 (the particle size of 50% volume of silicon secondary particles is 6.1 μm, and the particle size of 50% volume of graphite particles is 24.2 μm). Mix silicon composite material, graphite, conductive carbon and 0.6% polyacrylic acid emulsion (PAA) at an effective mass ratio of 1:7:1:1 to make a slurry, and apply the slurry according to the surface density of 100 g/m² on a copper foil with a thickness of 10 μm, which is then rolled to make the rolling density 1.6 g/cc, and then dried under vacuum at 120° C. for 24 h to make a negative electrode plate.

Embodiment 4

(1) Preparation of Nano-Silicon/Carbon Nanotubes/Silicon-Oxygen Complex.

Add 1 g of nano silicon, 0.05 g of carbon nanotubes, 1 g of alkyleneiminoalkenyldimethylsilane, and 0.1 g of polyethylene glycol with a molecular weight of 900 to 100 g of organic solvent N-methylpyrrolidone in sequence, stir and mix evenly. Spray dry to obtain a mixed powder, which is then carbonized at a high temperature of 600° C. for 5 h, and ball-milled to obtain a nano-silicon/carbon nanotube/silicon-oxygen complex.

(2) Lithium supplementation of silicon/carbon nanotube/silicon-oxygen complex.

Mix the activator (a mixture of 0.15M HCl, 0.05M HF and 0.05M sodium nitrate) and nano-silicon/carbon nanotubes/silicon-oxygen complex at room temperature for 10 h, then dry at 90° C. for 8 h, heat treat at 550° C. for 6 h, and finally cool to room temperature under the protection of Ar gas. The obtained cooled powder and lithium source (50 wt. % lithium sulfate and 50 wt. % lithium nitrate mixed solution) are evenly mixed and stirred at room temperature for 5 h, then heated at 3,000° C. under vacuum for 1 h, and cooled to room temperature under the protection of Ar gas. The obtained powder is mechanically milled and shaped to remove the surface oxide film, and then sieved and classified to obtain a silicon/carbon nanotube/silicon oxide/lithium oxide/lithium silicate composite material, also known as silicon secondary particles.

(3) Silicon Composite Material is Prepared into Negative Electrode Plate.

Classify the silicon composite material and graphite so that the particle size ratio of the silicon secondary particle size to the graphite particle is 1:8 (particle size of 50% volume of the silicon secondary particles is 3.1p m, and particle size of 50% volume of the graphite particles is 24.2 μm). Mix silicon composite material, graphite, conductive carbon and 0.6% polyacrylic acid emulsion (PAA) at an effective mass ratio of 6:74:10:10 to make a slurry and apply the slurry according to the surface density of 100 g/m² on a copper foil with a thickness of 10 μm, which is rolled to make the rolling density 1.6 g/cc, and then dried under vacuum at 120° C. for 24 h to make a negative electrode plate.

Embodiment 5

(1) Preparation of Nano-Silicon/Carbon Nanotubes/Silicon-Oxygen Complex

Add 1 g of nano silicon, 0.05 g of carbon nanotubes, 1 g of alkyleneiminoalkenyldimethylsilane, and 0.1 g of polyethylene glycol with a molecular weight of 900 to 100 g of organic solvent N-methylpyrrolidone in sequence, stir and mix evenly. Spray dry to obtain a mixed powder, which is carbonized at a high temperature of 600° C. for 5 h, and ball-milled to obtain a nano-silicon/carbon nanotube/silicon-oxygen complex.

(2) Lithium Supplementation of Silicon/Carbon Nanotube/Silicon-Oxygen Complex.

Mix the activator (a mixture of 0.15M HCl, 0.05M HF and 0.05M sodium nitrate) and nano-silicon/carbon nanotubes/silicon-oxygen complex at room temperature for 10 h. Then dry at 90° C. for 8 h, heat treat at 550° C. for 6 h, and finally cool to room temperature under the protection of Ar gas. The obtained cooled powder and lithium source (50 wt. % lithium sulfate and 50 wt. % lithium nitrate mixed solution) are evenly mixed and stirred at room temperature for 5 h, then heated at 3,000° C. under vacuum for 1 h, and cooled to room temperature under the protection of Ar gas. The obtained powder is mechanically milled and shaped to remove the surface oxide film, and then sieved and classified to obtain a silicon/carbon nanotube/silicon oxide/lithium oxide/lithium silicate composite material, also known as silicon secondary particles.

(3) Silicon Composite Material is Prepared into Negative Electrode Plate.

Classify the silicon composite material and graphite so that the particle size ratio of the silicon secondary particle size to the graphite particle is 1:8 (particle size of 50% volume of the silicon secondary particles is 3.1p m, and particle size of 50% volume of the graphite particles is 24.2 μm). Mix silicon composite material, graphite, conductive carbon and 0.6% polyacrylic acid emulsion (PAA) at an effective mass ratio of 2:78:10:10 to make a slurry and apply the slurry according to the surface density of 100 g/m² on a copper foil with a thickness of 10 μm, which is rolled to make the rolling density 1.6 g/cc, and then dried under vacuum at 120° C. for 24 h to make a negative electrode plate.

COMPARATIVE EXAMPLE 1

(1) Preparation of Silicon Composite Materials.

Add 1.5 g of nano-silicon, 0.03 g of carbon nanotubes, 1.5 g of alkyleneiminoalkenyldimethylsilane, and 0.2 g of polyethylene glycol with a molecular weight of 900 to 100 g of organic solvent acetone in sequence, stir and mix evenly. Spray dry to obtain a mixed powder, which is carbonized at a high temperature of 500° C. for 6 h, and then ball milled to obtain a nano-silicon/carbon nanotube/silicon-oxygen composite.

(2) The Silicon Composite Material is Prepared into a Negative Electrode Plate.

Classify the silicon composite material and graphite so that the particle size ratio of nano-silicon/carbon nanotubes/silicon-oxygen composites to graphite particles is 1:7 (particle size of 50% volume of silicon secondary particles is 3.5 μm, particle size of 50% volume of graphite particles is 24.2 μm). Mix silicon composite material, graphite, conductive carbon and 0.6% polyacrylic acid emulsion (PAA) at an effective mass ratio of 1:7:1:1 to make a slurry, and apply the slurry according to the surface density of 100 g/m² on a copper foil with a thickness of 10 μm, which is rolled to make the rolling density 1.6 g/cc, and then dried under vacuum at 120° C. for 24 h to form a negative electrode plate.

COMPARATIVE EXAMPLE 2

(1) Preparation of Nano-Silicon/Carbon Nanotubes/Silicon-Oxygen Complex.

Add 2 g of nano-silicon, 0.02 g of carbon nanotubes, 1.8 g of alkyleneiminoalkenyldimethylsilane, and 0.6 g of polyethylene glycol with a molecular weight of 900 to 100 g of carbon tetrachloride in sequence, stir and mix evenly. Spray dry to obtain a mixed powder, which is carbonized at a high temperature of 550° C. for 5.5 h, and then ball milled to obtain a nano-silicon/carbon nanotube/silicon-oxygen complex.

(2) Lithium Supplementation of Silicon/Carbon Nanotube/Silicon Oxygen Complex.

Mix the activator (a mixture of 0.2M HCl, 0.03M HF and 0.03M sodium nitrate) and nano-silicon/carbon nanotubes/silicon-oxygen complex at room temperature for 9 h. Then dry at 85° C. for 9 h, heat treat at 600° C. for 6 h, and finally cool to room temperature under the protection of Ar gas. The obtained cooled powder and lithium source (50 wt. % lithium nitrate and 50 wt. % lithium halide mixture) are evenly mixed and stirred at room temperature for 7 h, then heated at 2,500° C. under vacuum for 2 h, and cooled to room temperature under the protection of Ar gas. The obtained powder is shaped by a jet mill to remove the oxide film on the surface, and then sieved and classified to obtain a silicon/carbon nanotube/silicon oxide/lithium oxide/lithium silicate composite material.

(3) The Silicon Composite Material is Prepared into a Negative Electrode Plate.

Figure 4:
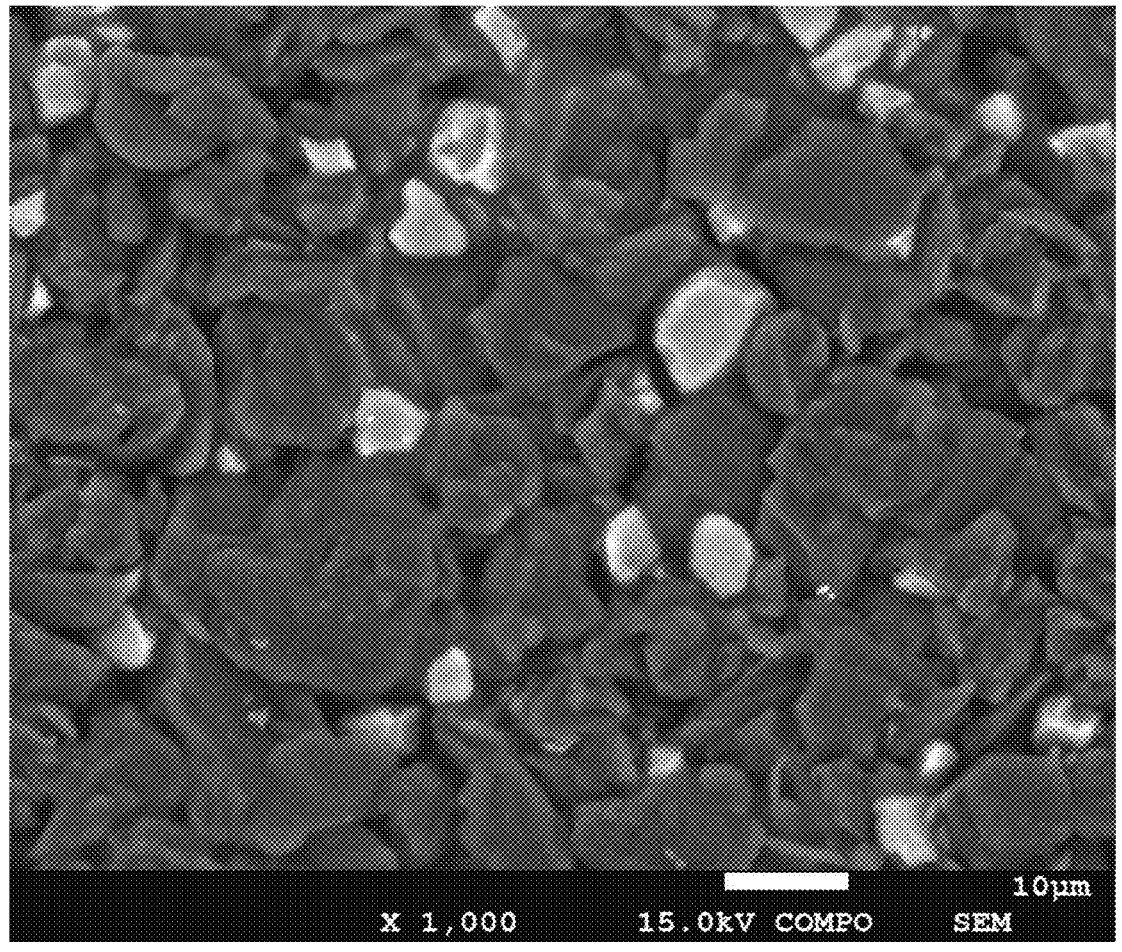
FIG. 4 is the SEM backscatter diagram of the rolled negative pole plate of comparative example 2.

Classify the silicon composite material and graphite so that the particle size ratio of silicon secondary particles to graphite particles is 1:3 (particle size of 50% volume of silicon secondary particles is 8.1 μm, particle size of 50% volume of graphite particles is 24.2 μm). Mix silicon composite material, graphite, conductive carbon and 0.6% polyacrylic acid emulsion (PAA) at an effective mass ratio of 1:7:1:1 to make a slurry, and apply the slurry according to the surface density of 100 g/m² on a copper foil with a thickness of 10 μm, which is rolled to make the rolling density 1.6 g/cc, and then dried under vacuum at 120° C. for 24 h to make a negative electrode plate. FIG. 4 is the SEM backscatter diagram of the negative electrode plate provided in this comparative example after rolling. In the figure, there are silicon secondary particles with a relatively large particle size (about 8 μm). During the cycles, the silicon particles will expand violently (about 200% volume expansion rate), and the surrounding graphite particles cannot effectively restrain their volume expansion. As a result, the distribution of graphite particles around changes, the original pole piece arrangement structure is destroyed, and the conductive network is damaged.

COMPARATIVE EXAMPLE 3

(1) Preparation of Nano-Silicon/Carbon Nanotubes/Silicon-Oxygen Complex.

Add 2 g of nano-silicon, 0.02 g of carbon nanotubes, 1.8 g of alkyleneiminoalkenyldimethylsilane, and 0.6 g of polyethylene glycol with a molecular weight of 900 to 100 g of carbon tetrachloride in sequence, stir and mix evenly. Spray dry to obtain a mixed powder, which is carbonized at a high temperature of 550° C. for 5.5 h, and ball milled to obtain a nano-silicon/carbon nanotube/silicon-oxygen complex.

(2) Lithium Supplementation of Silicon/Carbon Nanotube/Silicon Oxygen Complex.

Mix the activator (a mixture of 0.2M HCl, 0.03M HF and 0.03M sodium nitrate) and nano-silicon/carbon nanotubes/silicon-oxygen complex at room temperature for 9 h. Then dry at 85° C. for 9 h, heat treat at 600° C. for 6 h, and finally cool to room temperature under the protection of Ar gas. The obtained cooled powder and lithium source (50 wt. % lithium nitrate and 50 wt. % lithium halide mixture) are evenly mixed and stirred at room temperature for 7 h, then heated at 2,500° C. under vacuum for 2 h, and cooled to room temperature under the protection of Ar gas. The obtained powder is shaped by a jet mill to remove the oxide film on the surface, and then sieved and classified to obtain a silicon/carbon nanotube/silicon oxide/lithium oxide/lithium silicate composite material.

(3) The Silicon Composite Material is Prepared into a Negative Electrode Plate.

Classify the silicon composite material and graphite so that the particle size ratio of silicon secondary particles to graphite particles is 1:11 (particle size of 50% volume of silicon secondary particles is 2.2 μm, particle size of 50% volume of graphite particles is 24.2 μm). Mix silicon composite material, graphite, conductive carbon and 0.6% polyacrylic acid emulsion (PAA) at an effective mass ratio of 1:7:1:1 to make a slurry, and apply the slurry according to the surface density of 100 g/m² on a copper foil with a thickness of 10 μm, which is rolled to make the rolling density 1.6 g/cc, and then dried under vacuum at 120° C. for 24 h to make a negative electrode plate.

COMPARATIVE EXAMPLE 4

(1) Preparation of Nano-Silicon/Carbon Nanotubes/Silicon-Oxygen Complex.

Add 2 g of nano-silicon, 0.02 g of carbon nanotubes, 1.8 g of alkyleneiminoalkenyldimethylsilane, and 0.6 g of polyethylene glycol with a molecular weight of 900 to 100 g of carbon tetrachloride in sequence, stir and mix evenly. Spray dry to obtain a mixed powder, which is carbonized at a high temperature of 550° C. for 5.5 h, and ball milled to obtain a nano-silicon/carbon nanotube/silicon-oxygen complex.

(2) Lithium Supplementation of Silicon/Carbon Nanotube/Silicon Oxygen Complex.

Mix the activator (a mixture of 0.2M HCl, 0.03M HF and 0.03M sodium nitrate) and nano-silicon/carbon nanotubes/silicon-oxygen complex at room temperature for 9 h, then dry at 85° C. for 9 h, heat-treated at 600° C. for 6 h, and finally cooled to room temperature under the protection of Ar gas. The obtained cooled powder and lithium source (50 wt. % lithium nitrate and 50 wt. % lithium halide mixed solution) are mixed and stirred evenly at room temperature for 7 h, then heated at 2,000° C. under vacuum for 0.5 h, and cooled to room temperature under the protection of Ar gas. The obtained powder is shaped by a jet mill to remove the oxide film on the surface, and then sieved and classified to obtain a silicon/carbon nanotube/silicon oxide/lithium oxide/lithium silicate composite material.

(3) The Silicon Composite Material is Prepared into a Negative Electrode Plate.

Classify the silicon composite material and graphite so that the particle size ratio of silicon secondary particles to graphite particles is 1:6 (the particle size of 50% volume silicon secondary particles is 6.1 μm, and the particle size of 50% volume of graphite particles is 24.2 μm). Mix silicon composite material, graphite, conductive carbon and 0.6% polyacrylic acid emulsion (PAA) at an effective mass ratio of 1:7:1:1 to make a slurry, and apply the slurry according to the surface density of 100 g/m² on a copper foil with a thickness of 10 μm, which is rolled to make the rolling density 1.6 g/cc, and then dried under vacuum at 120° C. for 24 h to make a negative electrode plate.

COMPARATIVE EXAMPLE 5

(1) Preparation of Nano-Silicon/Carbon Nanotubes/Silicon-Oxygen Complex.

Add 2 g of nano-silicon, 0.02 g of carbon nanotubes, 1.8 g of alkyleneiminoalkenyldimethylsilane, and 0.6 g of polyethylene glycol with a molecular weight of 900 to 100 g of carbon tetrachloride in sequence, stir and mix evenly. Spray dry to obtain a mixed powder, which is carbonized at a high temperature of 550° C. for 5.5 h, and ball milled to obtain a nano-silicon/carbon nanotube/silicon-oxygen complex.

(2) Lithium Supplementation of Silicon/Carbon Nanotube/Silicon Oxygen Complex.

Mix the activator (a mixture of 0.2M HCl, 0.03M HF and 0.03M sodium nitrate) and nano-silicon/carbon nanotubes/silicon-oxygen complex at room temperature for 9 h. Then dry at 85° C. for 9 h, heat treat at 600° C. for 6 h, and finally cool to room temperature under the protection of Ar gas. The obtained cooled powder and lithium source (50 wt. % lithium nitrate and 50 wt. % lithium halide mixed solution) are evenly mixed and stirred at room temperature for 7 h, then heated at 3,500° C. under vacuum for 5 h, and cooled to room temperature under the protection of Ar gas. The obtained powder is shaped by a jet mill to remove the oxide film on the surface, and then sieved and classified to obtain a silicon/carbon nanotube/silicon oxide/lithium oxide/lithium silicate composite material.

(3) The Silicon Composite Material is Prepared into a Negative Electrode Plate.

Classify the silicon composite material and graphite so that the particle size ratio of silicon secondary particles to graphite particles is 1:6 (the particle size of 50% volume silicon secondary particles is 6.1 μm, and the particle size of 50% volume of graphite particles is 24.2 μm). Mix silicon composite material, graphite, conductive carbon and 0.6% polyacrylic acid emulsion (PAA) at an effective mass ratio of 1:7:1:1 to make a slurry, and apply the slurry according to the surface density of 100 g/m² on a copper foil with a thickness of 10 μm, which is rolled to make the rolling density 1.6 g/cc, and then dried under vacuum at 120° C. for 24 h to make a negative electrode plate.

Embodiment 6, Application Performance Detection

The negative electrode plates prepared in the above examples and comparative examples are used for battery assembly and testing, and the steps are as follows.

The electrode is a metal lithium plate with a purity of 99.9%; and the electrolyte is the solution of ethylene carbonate (EC)/ethyl methyl carbonate (EMC)/diethyl carbonate (DEC) (volume ratio 3:5:2) and 1.1 mol lithium hexafluorophosphate (LiPF6). After the negative electrode plate, metal lithium plate, battery shell, and diaphragm are dried, the electrolyte is added in an argon-protected glove box to assemble a button-type lithium-ion battery. The battery is subjected to a charge-discharge cycle test, the charge voltage is cut off to 2.0V, the discharge voltage is cut to 0.005V, and the charge-discharge cycle rate is 0.1C. The lithiation and delithiation capacity for the first time, and the delithiation capacity data after 50 cycles are shown in Table 1.

TABLE 1

The detection data of the lithiation and delithiation capacity for the
first time of batteries made of negative electrode materials, the delithiation
capacity after 50 cycles and the pole piece thickness

| | Lithiation capacity for the first time mAh/g | Delithiation capacity for the first time mAh/g | First coulombic efficiency | Delithiation capacity after 50 cycles mAh/g | Capacity retention rate after 50 cycles | Thickness of pole piece after 50 cycles/μm |
|---|---|---|---|---|---|---|
| Embodiment 1 | 513 | 461 | 89.9% | 391 | 84.8% | 78 |
| Embodiment 2 | 501 | 447 | 89.2% | 375 | 83.9% | 77 |
| Embodiment 3 | 510 | 452 | 88.6% | 380 | 84.1% | 75 |
| Embodiment 4 | 456 | 413 | 90.6% | 361 | 87.4% | 73 |
| Embodiment 5 | 404 | 370 | 91.6% | 333 | 90.0% | 69 |
| Comparative example 1 | 499 | 389 | 78.0% | 322 | 82.7% | 80 |
| Comparative example 2 | 508 | 450 | 88.5% | 366 | 81.3% | 87 |
| Comparative example 3 | 509 | 449 | 88.3% | 336 | 74.8% | 76 |
| Comparative example 4 | 520 | 452 | 86.9% | 376 | 83.2% | 80 |
| Comparative example 5 | 509 | 450 | 88.4% | 367 | 81.6% | 83 |

It can be seen from Table 1 that the silicon composite materials prepared in Embodiments 1-3 of the present disclosure exhibit higher coulombic efficiency, lower volume expansion and better cycle performance.

Specific embodiments of the present disclosure have been described above. It should be understood that the present disclosure is not limited to the specific embodiments described above, and those skilled in the art may make various changes or modifications within the scope of the claims, which do not affect the essence of the present disclosure.

What is claimed is:

1. A method for preparing a negative electrode plate containing a silicon composite material, wherein the negative electrode plate also contains graphite; a particle size ratio of the silicon composite material to the graphite is 1:10~1:5; the method comprising the following steps:

S1. add silicon nanoparticles, carbon nanotubes, silane coupling agent, and dispersant into an organic solvent, stir evenly, and spray dry to obtain a mixed powder; carbonize the mixed powder at high temperature, and ball mill to obtain a silicon/carbon nanotube/silicon-oxygen complex;

S2. perform activation treatment on the silicon/carbon nanotube/silicon-oxygen complex; mix the activated silicon/carbon nanotube/silicon-oxygen complex with a lithium source, and ball mill to obtain a mixture; heat treat the mixture; classify the heat-treated mixture to obtain secondary particles which are the silicon composite material;

S3. mix the silicon composite material with the graphite, conductive carbon and polyacrylic acid emulsion to prepare a slurry, apply the slurry on a negative electrode current collector, roll and then dry under vacuum and high temperature to form the negative electrode plate.

2. The method for preparing the negative electrode plate according to claim 1, wherein, in step S3, the negative electrode current collector comprises a copper foil, a nickel foil or a copper-nickel alloy.

3. The method for preparing the negative electrode plate according to claim 1, wherein, in step S3, in the slurry, a mass ratio of the silicon composite material, the graphite, the conductive carbon and the polyacrylic acid emulsion is 1:7:1:1~0.2:7.8:1:1.

4. The method for preparing the negative electrode plate according to claim 1, wherein, in step S1, a weight ratio of the silicon nanoparticles, the carbon nanotubes, the silane coupling agent, the dispersant, and the organic solvent is (1~5):(0.01~0.05):(1~5):(0.1~1):100.

5. The method for preparing the negative electrode plate according to claim 1, wherein, in step S2, the lithium source comprises a solid-phase and/or liquid-phase lithium source; the liquid-phase lithium source comprises one or more of below substances: lithium sulfate, lithium nitrate, and lithium halides.

6. The method for preparing the negative electrode plate according to claim 1, wherein, in step S2, the step of activation treatment comprises: uniformly mixing an activator with the silicon/carbon nanotube/silicon-oxygen complex to obtain an mixed product;

drying and heat treating the mixed product, and then cooling to room temperature under gas protection; the activator includes one or more of below substances: 0.1~3M HF, 0.1~1M HCl, 0.1~1M sodium nitrate, and 0.1~1M potassium permanganate.

7. A negative electrode plate containing a silicon composite material prepared by the method according to claim 1, wherein the negative electrode plate is used for a lithium battery.

* * * * *